(12) United States Patent
Tuzel et al.

(10) Patent No.: US 8,983,177 B2
(45) Date of Patent: Mar. 17, 2015

(54) METHOD FOR INCREASING RESOLUTIONS OF DEPTH IMAGES

(71) Applicant: Mitsubishi Electric Research Laboratories, Inc, Cambridge, MA (US)

(72) Inventors: Oncel Tuzel, Winchester, MA (US); Ming-Yu Liu, Cambridge, MA (US); Yuichi Taguchi, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 155 days.

(21) Appl. No.: 13/756,935

(22) Filed: Feb. 1, 2013

(65) Prior Publication Data
US 2014/0219547 A1    Aug. 7, 2014

(51) Int. Cl.
*G06K 9/32*    (2006.01)
*G06T 3/40*    (2006.01)

(52) U.S. Cl.
CPC .................................. *G06T 3/4053* (2013.01)
USPC ......................................... 382/154; 382/300

(58) Field of Classification Search
CPC .......... H04N 13/0011; H04N 21/2365; H04N 21/4347; G06K 9/46; G06K 9/36; G06K 9/6215; G06K 9/6857; G06T 1/00; G06T 2200/04; G06T 2207/20144; G06T 3/4007; G06T 7/0081; G06T 7/0083; G06T 5/002; G06F 2101/06
USPC ......... 382/154, 173, 181, 232, 254, 276, 103, 382/128–137, 167, 109, 299, 195, 300, 164, 382/240; 348/169–172, 700, E13.062, 348/E13.065, 581, 43, 441; 375/240.01, 375/240.12, 240.03, 240.25
See application file for complete search history.

(56) References Cited

U.S. PATENT DOCUMENTS

| 7,889,949 B2 * | 2/2011 | Cohen et al. .................. 382/299 |
| 8,351,654 B2 * | 1/2013 | Criminisi et al. ............. 382/109 |

OTHER PUBLICATIONS

Kopf et al., "Joint Bilateral Upsampling," ACM Transactions on Graphics: SIGGRAPH, 2007. 26(3), Article No. 96, 2007.
Antonio Criminisi, Toby Sharp, Carsten Rother, and Patrick Perez, Geodesic Image and Video Editing, in Invited talk at SIGGRAPH, Aug. 2011, Vancouver. Published in ACM Transactions on Graphics, 2010. , Aug. 2011.

\* cited by examiner

*Primary Examiner* — Sheela Chawan
(74) *Attorney, Agent, or Firm* — Dirk Brinkman; Gene Vinokur

(57) ABSTRACT

A resolution of a low resolution depth image is increased by applying joint geodesic upsampling to a high resolution image to obtain a geodesic distance map. Depths in the low resolution depth image are interpolated using the geodesic distance map to obtain a high resolution depth image. The high resolution image can be a gray scale or color image, or a binary boundary map. The low resolution depth image can be acquired by any type of depth sensor.

19 Claims, 5 Drawing Sheets

METHOD FOR INCREASING RESOLUTIONS OF DEPTH IMAGES

FIELD OF THE INVENTION

The invention relates generally to depth images, and more particularly to increasing resolutions of depth images.

BACKGROUND OF THE INVENTION

Depth images can be used for 3D scene analysis and other 3D computer vision applications. Typically, the resolution of the depth images is substantially less than comparable optical images, i.e., gray scale or color images. The resolution of images acquired by optical cameras can easily be ten megapixels or greater, while the resolution of depth images is typically less than 0.02 megapixels. As defined herein, pixels in optical images only have associated intensities, perhaps in multiple color channels. A depth image only has associated depths for the pixels.

One way to increase the resolution of the depth images is to use a high resolution optical image that is registered to a low resolution depth image. In general depth and color boundaries of a scene are correlated. Abrupt depth transition often leads to abrupt color transition.

Depth upsampling can be global or local. Global methods formulate depth upsampling as an optimization problem. A large cost is induced when neighboring pixels having similar color intensities are assigned very different depths, which encourages that upsampled depth boundaries coincide with color boundaries. Those methods can produce accurate depth images but are generally too slow for real-time applications. Local methods, based on filtering operations, can be performed in real-time. Joint bilateral upsampling is a local method that uses bilateral filtering in a joint optical and spatial space.

Geodesic distances have been used in various applications, such as colorization, image matting, and image de-noising. A fast marching procedure and a geodesic distance transform are two commonly used implementations for the distance determination. Both have a linear time complexity. However those techniques are too slow to determine all shortest path pairs for geodesic upsampling in real-time.

U.S. Pat. No. 7,889,949, "Joint bilateral upsampling," issued to Cohen et al. on Feb. 15, 2011, uses a high-resolution input signal having a first resolution, and a low-resolution solution set having a second resolution computed from a downsampled version of the high-resolution signal. A joint bilateral upsampling, using the low-resolution solution set and the high-resolution signal, is performed to generate a high-resolution solution set having a resolution equivalent to the first resolution. The method described therein uses bilateral upsampling. Bilateral upsampling uses separate color and spatial kernels which causes blurry depth boundaries and depth bleeding artifacts particularly when the colors of the surfaces across the depth boundaries are similar. In addition, fine scene structures are not preserved during upsampling.

Criminisi et al., in "Geodesic image and video editing," ACM Transaction on Graphics, volume 29, issue 5, October 2010, describe image editing tasks, n-dimensional segmentation, edge-aware denoising, texture flattening, cartooning, soft selection, and panoramic stitching. The editing uses a symmetric operator based on the generalized geodesic distance to process high resolutions color images without the need for depth images or spatial upsampling.

SUMMARY OF THE INVENTION

The embodiments of the invention provide a method for increasing a resolution of a depth image of a scene using a high resolution optical image of the same scene. The method determines a depth for each pixel in the high resolution optical image using geodesic paths to corresponding pixels in a low resolution depth image.

The method uses a novel approximation procedure with a linear complexity as a function of image size and can achieve real-time performance. In addition, the method can also be used with binary edge maps in sensor fusion applications.

Geodesic curves are shortest paths on an image grid. The method determines joint geodesic distances (i.e., lengths of the geodesic curves) for pixels in the high resolution optical image. Then, the distances are used to propagate low resolution depths to the high resolution grid in a smooth and depth discontinuity preserving manner.

Because the geodesic distance integrates joint color (intesity) and spatial changes along the curve, the distance is especially sensitive to thin contours around surfaces, providing sharp depth boundaries even when the color difference between two surfaces is subtle. In addition, the geodesic paths can follow thin segments with uniform colors, and therefore produce high quality depth images with fine details. Determining geodesic distances is closely related to an all-pair-shortest-path problem, which is a computationally intensive operation. Hence, obtaining geodesic distances by solving the all-pair-shortest-path problem is unsuitable for real-time processing.

The method uses a novel approximation procedure for simultaneously locating K nearest pixels, in a geodesic sense, where the complexity is linear with respect to the image size and K.

The method produces accurate high resolution depth images for smooth surfaces and boundary regions. The method is also well suited for upsampling depth images using binary edge maps acquired by a multi-flash camera or other means. Using binary edge maps for upsampling depth images is difficult to achieve with most prior art methods.

A prior art method used a joint bilateral upsampling procedure, which interpolates low resolution depths to a high resolution grid based on a set of weights determined as multiplications of spatial kernels and color kernels. The kernels use Euclidean distances to quantify the dissimilarities of the pixels. Using two kernels causes blurry depth boundaries and depth bleeding artifacts, particularly when the colors of the surfaces across the depth boundaries are similar. In addition, fine scene structures cannot be preserved during upsampling.

DETAILED DESCRIPTION OF THE PREFERRED EMBODIMENTS

Figure 1:
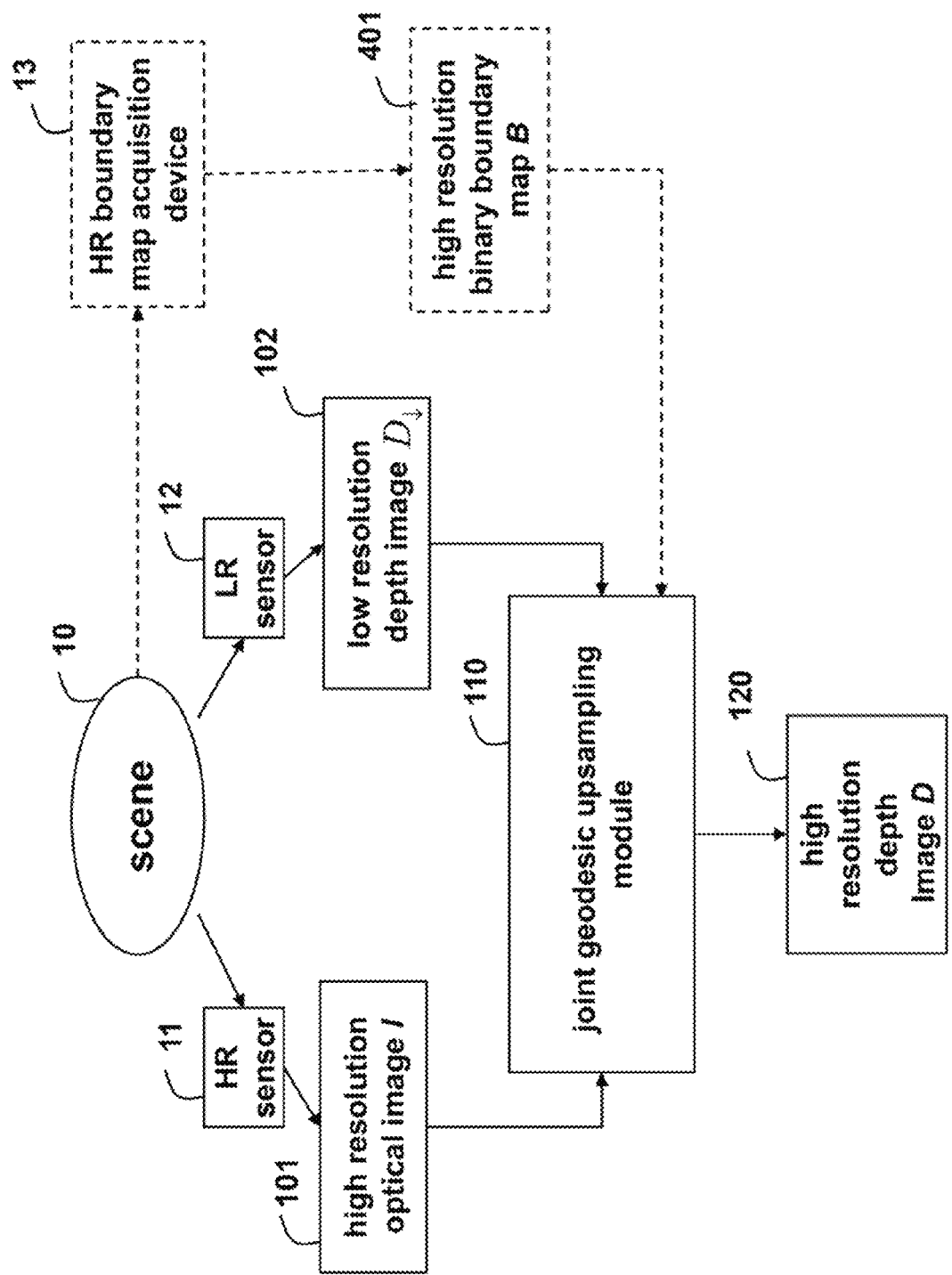
FIG. 1 is a flow diagram of a method for increasing a resolution of a depth image using a high resolution optical image 101 (or high resolution binary boundary map 401) by performing joint geodesic upsampling according to embodiments of the invention.

FIG. 1 shows a method for increasing a resolution (upsampling) of a depth image 102 acquired of a scene 10 using a high resolution optical image 101, e.g., a gray scale or color image, acquired of the same scene, by performing joint geodesic upsampling 110 according to embodiments of our invention. The images 101-102 can be obtained by a high resolution (HR) sensor 11 and low resolution sensor (LR) 12, respectively.

It should be noted, that the method can be used to upsample other types of low-resolution image, such as thermal images, X-ray images, ultrasound images, radar images, and multispectral images, if there is a corresponding high-resolution image acquired in the same or a different imaging modality. In these other types of low resolution images the pixels values do not necessarily represent depths, but could represents other physical quantities, such densities, opacities, and edges, for example, depending on the imaging modality. The images can also be synthetic, or computer generated.

Figure 2:
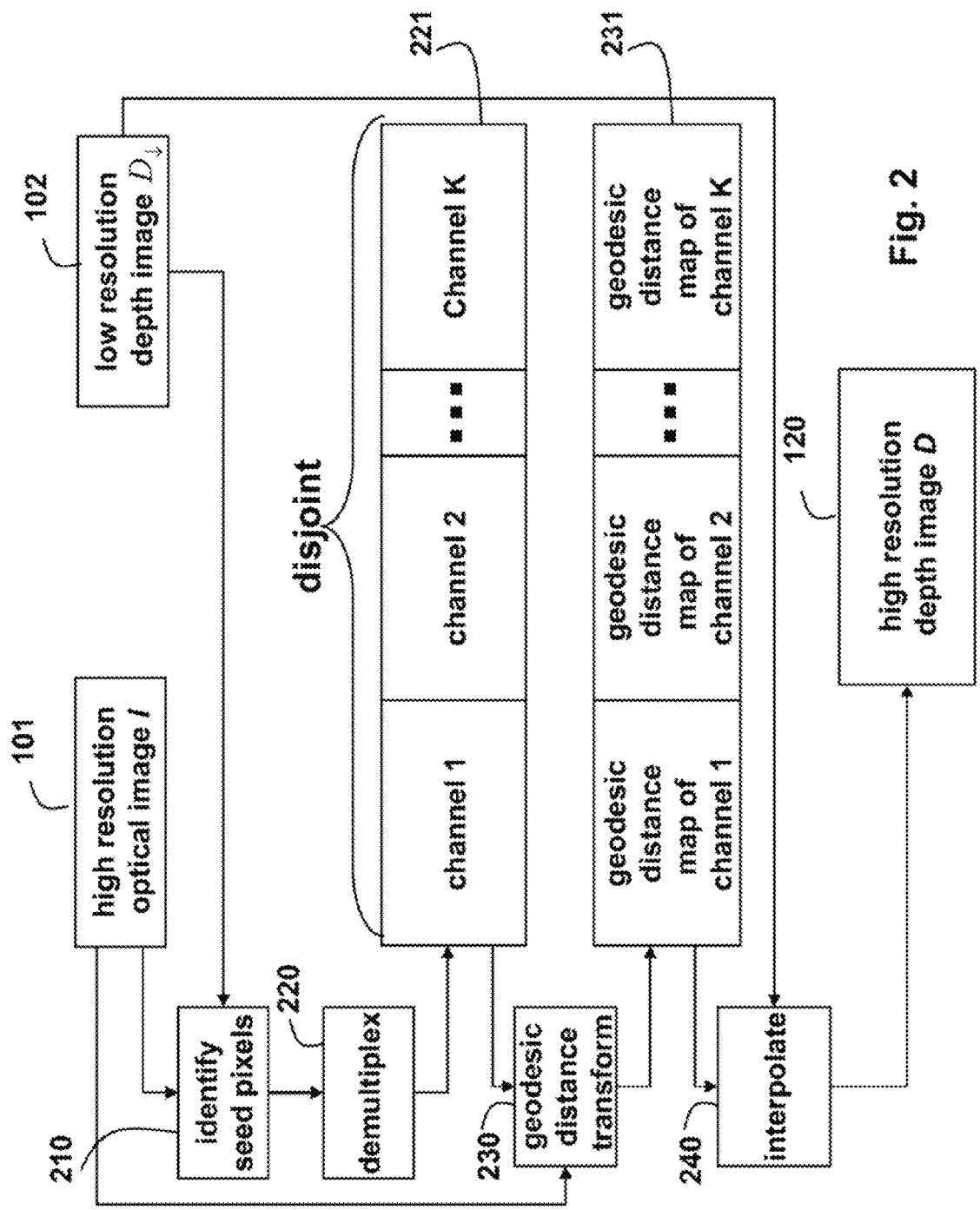
FIG. 2 is a flow diagram of an optimization method for computation of joint geodesic upsampling using the high resolution image.

If the low resolution image is a depth image, then the pixels in the depth image represent depths, and pixels in the optical image represent intensities. The depth image and the optical image are registered with each other, i.e., correspondences between the pixels in the depth image and the pixels in the optical image are known. The details are shown in FIG. 2.

Figure 4:
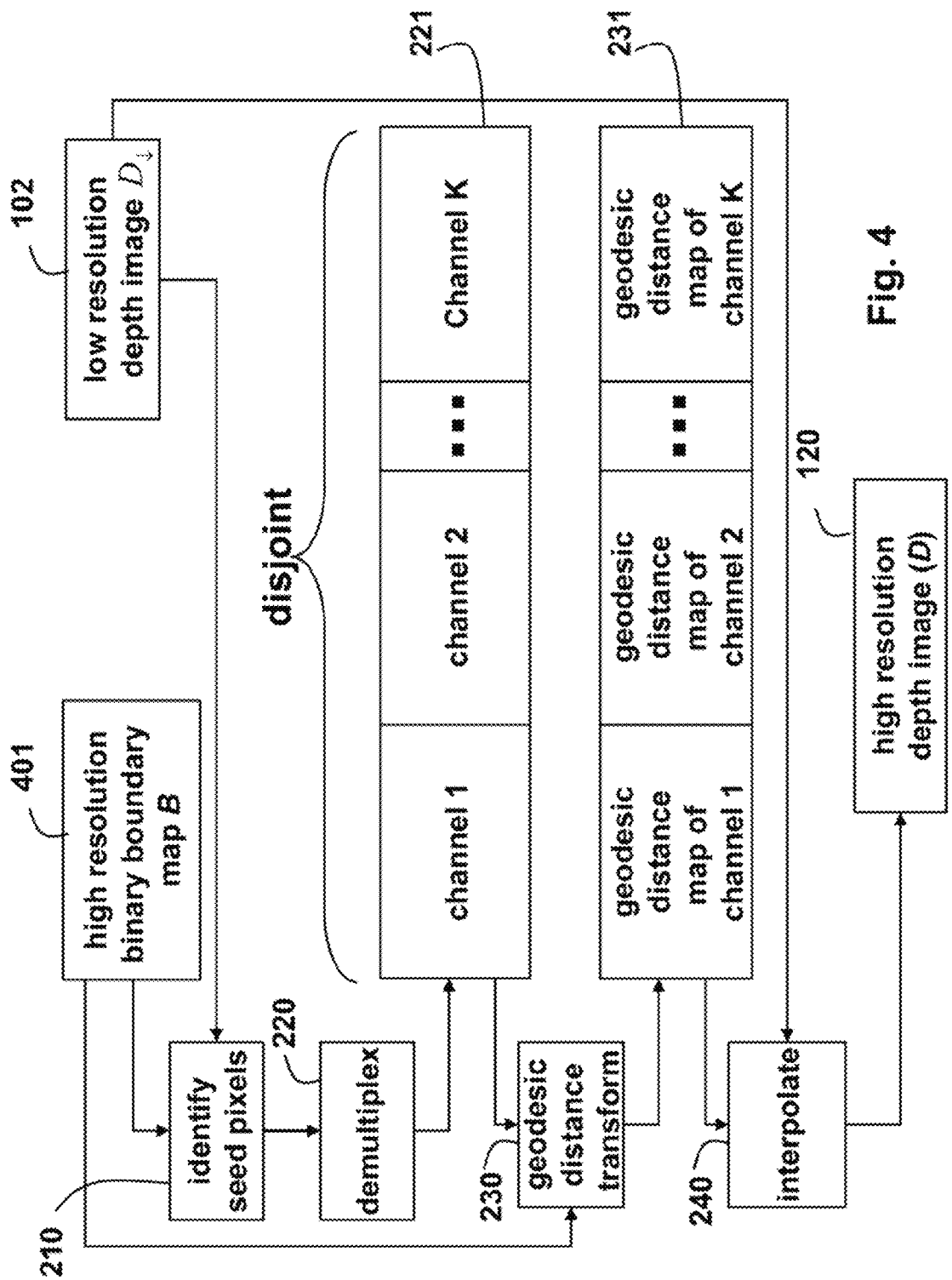
FIG. 4 is a flow diagram of the optimization method for computation of joint geodesic upsampling using the high resolution binary boundary map.

An alternative embodiment shown in FIG. 4 uses a high resolution boundary map B 401, which only indicates spatial distances for determining a geodesic distance transform.

Joint Geodesic Upsampling

Figure 3:
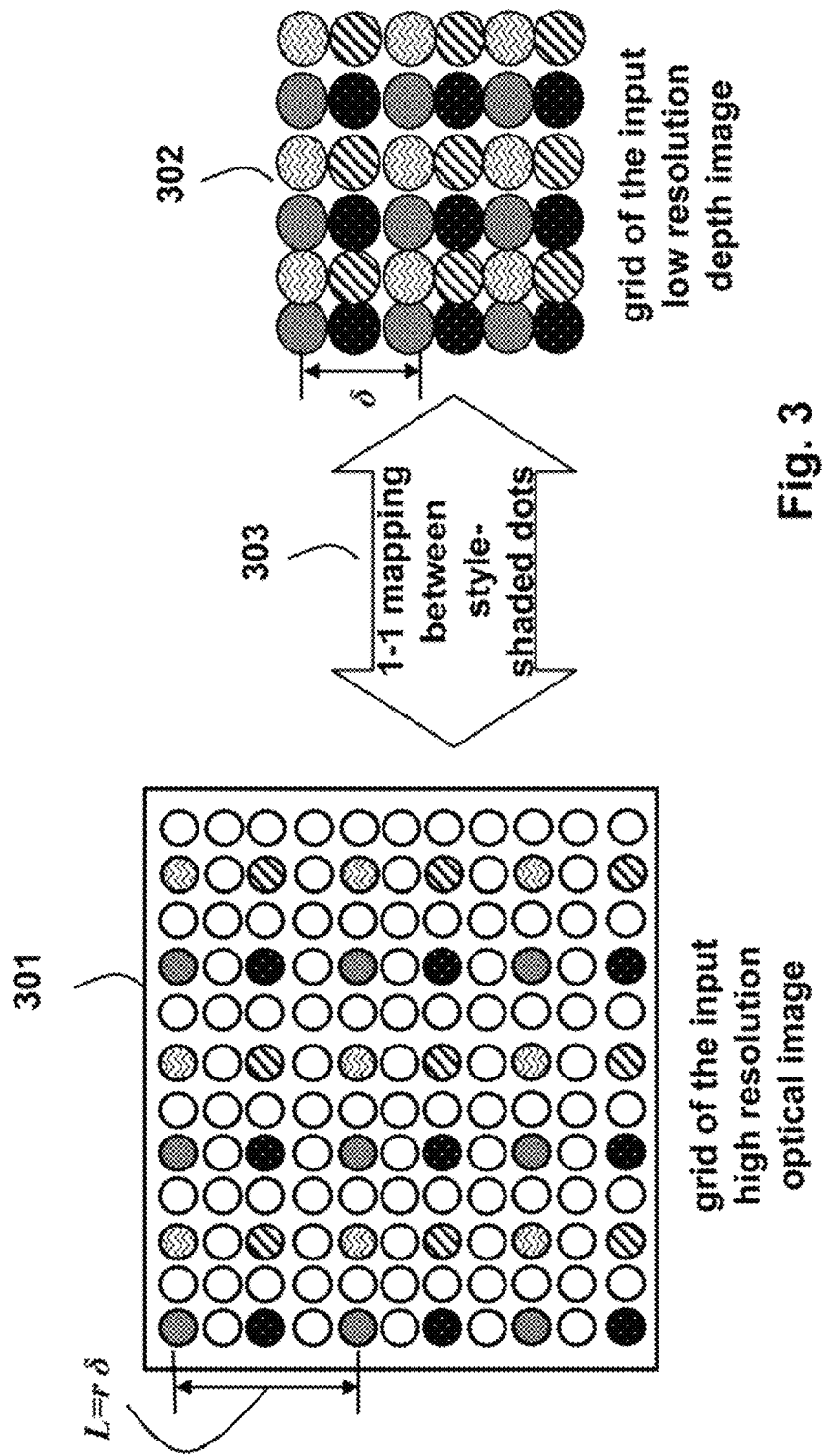
FIG. 3 is a schematic of correspondences between the pixels in the low resolution depth image and the seed pixels in the high resolution optical image.

The high resolution optical image 101 is I, and the low resolution depth image 102 is $D\downarrow$, where the resolution of I is r times larger than the resolution of the depth image $D\downarrow$. The two images are registered so that each grid point in the depth image $D\downarrow$ can be mapped to a corresponding grid point in I. As shown in FIG. 3, we assume a simple 1-1 mapping 303, where the pixel at a location (i, j) in $D\downarrow$ is mapped to the pixel at a location (ir, jr) in I. The goal of the joint geodesic upsampling 110 is to construct the high resolution output depth image D 120 with a resolution equal to the resolution of the opical image I 101, or the high resolution boundary map B 401 in the alternative embodiment.

Depths of seed pixels in the sparse grid points in D are obtained from the corresponding low resolution depth image $D\downarrow$. These depths are used to incorporate the depths of other pixels in D. We use an interpolation approach such that the depth for the pixel x in D is $$D(x) = \sum_{y\downarrow} g_G(x, y) D_\downarrow(y_\downarrow), \quad (1)$$

where y and $y\downarrow$ are respectively the corresponding coordinates of the seed pixels in the high and low resolution images, and $g_G$ is a kernel function measuring an affinity between the two pixels at coordinates x and y. The kernel function $g_G$ is given in equation (3).

We use geodesic distances in a joint optical and spatial domain to determine the affinity measure between the two pixels. The geodesic distance is a shortest path between two pixels on the image grid, which we assume to be 8-connected, i.e., each pixel is only connected to its eight neighboring pixels.

Let p be a path joining coordinates x and y, which can be uniquely represented by a sequence of pixels the path traverses, i.e., $x=x_p^{(1)}, x_p^{(2)}, x_p^{(3)}, \ldots, x_p^{(|p|)}=y$, where $|p|$ denotes the number of pixels in the sequence. Let P be the set of all the paths joining x and y. The geodesic distance between x and y is given by the length of the shortest path $$d_G(x, y) = \min_{p \in P} \sum_{i=2}^{|p|} \left( \frac{1}{r} \|x_p^{(i)} - x_p^{(i-1)}\|_2 + \lambda \|I(x_p^{(i)}) - I(x_p^{(i-1)})\|_2 \right), \quad (2)$$

where $\lambda$ is a weighting parameter, $\|x_p^{(i)} - x_p^{(i-1)}\|_2$ is the spatial distance, and $\|I(x_p^{(i)}) - I(x_p^{(i-1)})\|_2$ is the color (intensity) distance between $x_p^{(i)}$ and $x_p^{(i-1)}$. We use a Gaussian kernel to convert the geodesic distance into the affinity measure:

$$g_G(x, y) = \exp\left(\frac{-d_G^2(x, y)}{2\sigma^2}\right), \quad (3)$$

where $\sigma$ is the kernel bandwidth parameter. For example, we set $\lambda$ to 10 and $\sigma$ to 0.5 when K=4.

The joint geodesic upsampling can also be performed hierarchically using an image pyramid. Instead of upsampling the low resolution depth image r times in a single step, we can upsample the depth image $2^{(\log_2 r/L)}$ times in the single step and repeat the step L times. In this case, the $I^{th}$ upsampling step (I=1, ..., L) uses an optical image obtained by downsampling the input high resolution optical image $2^{(L-1)(\log_2 r/L)}$ times, and produces a depth map with the resolution $2^{l(\log_2 r/L)}$ times higher than the input low resolution depth map. The depth map obtained in the $I^{th}$ step can be used as the input to the $(I+1)^{th}$ step.

Optimization Method for Computation of Joint Geodesic Upsampling

Direct computation of joint geodesic upsampling using (1) is slow. FIG. 2 shows an optimization method for computation of joint geodesic upsampling. To determine the depth of a pixel, it is sufficient to propagate information from its K nearest depth pixels as defined in the geodesic sense. We identify 210 a set of pixels whose depths are known from the low resolution input depth image. Those pixels are called seed pixels. We then demultiplex 220 the seed pixels into K disjoint channels 221. For each channel, we apply a geodesic distance transform 230, which produces a geodesic distance map 231 from each pixel in the optical image to the nearest seed pixel. Then, the depths of the seed pixels are propagated using interpolation 240 to produce the high resolution output depth image 120. The above steps, as well as other procedures and methods described herein, can be performed in a processor connected to memory and input/output interfaces as known in the art.

Demultiplexing

We partition the seed pixels into K channels using the demultiplexing. The optimal demultiplexing strategy is uniform partitioning of the image grid. An interval of this demultiplexing, i.e., the distance between two consecutive pixels in a given channel on the low resolution grid 302, is $\delta$ and $K=\delta^2$. These two consecutive pixels map to the seed pixels on the high resolution grid 301, which are at a distance $L=r\delta$ pixels, where r is the upsampling ratio. Thus, the first channel includes grid points (iL, jL) in the high resolution grid, where i and j are nonnegative integers, and the second channel includes grid points (iL, r+jL), and so forth.

Geodesic Distance Transform (GDT)

For each channel, we determine the geodesic distance transform, which provides the shortest distance from each pixel in the optical image to the nearest seed pixel. Let $S_k$ be the set of seed pixels in the $k^{th}$ channel. The geodesic distance transform solves the following optimization problem $$M_k(x) = \min_{y \in S_k} d_G(x, y), \qquad (4)$$

where a length of the shortest path $d_G(x, y)$ between pixels x and y is defined in equation (2). Equation (4) can be solved with a dynamic program including a sequence of forward and backward passes over the high resolution grid.

The forward pass traverses the image from top-left to bottom-right, where each pixel is updated according to $$M_k(x) \leftarrow \min_{v \in V_f} M_k(x + v) + d_G(x, x + v). \qquad (5)$$

Here, $v_f$ denotes a set of pixel offsets for the forward pass and includes the original pixel, and upper-left, upper, upper-right, and left neighboring pixels as follows:

$V_f = \{(0,0),(-1,-1),(0,-1),(1,-1),(-1,0)\}$.

Similarly, the backward pass traverses the image in the reverse order according to $$M_k(x) \leftarrow \min_{v \in V_b} M_k(x + v) + d_G(x, x + v), \qquad (6)$$

where a set of pixel offsets for the backward pass $V_b$ is $V_b = \{(0,0),(1,1),(0,1),(-1,1),(1,0)\}$.

Exact determination of the geodesic distance transform requires multiple iterations of the forward and backward passes until convergence. In typical cases, convergence can be achieved within ten iterations. We can also terminate the computation after a smaller number of iterations, e.g., 3-5, and still obtain a good approximation.

Interpolation

After determining the geodesic distance transform for each channel, we propagate the depths of the seed pixels in the low resolution depth image to the high resolution grid using the geodesic distances. The geodesic distance transform also provides the coordinates of the nearest seed pixels, and hence the depths for the propagation.

The geodesic distance transform for channel k is $M_k$, where the distance from a pixel x to its nearest seed pixel in channel k is $M_k(x)$, and its coordinate is $y_\downarrow^k(x)$. The approximate geodesic upsampling is $$D(x) = \sum_{k=1}^{K} \exp\left(\frac{-(M_k(x))^2}{2\sigma^2}\right) D_\downarrow(y_\downarrow^k(x)). \qquad (7)$$

Even when only one neighboring pixel is used for upsampling, the nearest seed pixel to a pixel is not necessarily one of its immediate neighbors in the low resolution grid. The shortest paths are defined on the high resolution grid, which is sparsely covered by the seed pixels, and a path can reach a spatially distant seed pixel if the pixels along the path are similar in intensity (color). This property is important for recovering thin structures that are only apparent in the optical image.

Depth Upsampling Using Binary Boundary Maps

The method can also be used for upsampling depth images using binary boundary maps in sensor fusion applications. In one embodiment of the invention, we upsample a low resolution depth image obtained using a low resolution depth sensor with a high resolution binary boundary map. The depth sensor can use ultrasound, radio signals, or optical signals, e.g., a laser or a projector.

The binary boundary map can be obtained as a depth discontinuity map from optical images acquired by a multi-flash camera (MFC), see U.S. Pat. No. 7,738,725. The binary boundary map can also be aquired by other means, e.g., by applying an edge detector to an optical image, producing an intensity discontinuity map.

FIG. 4 shows the optimization method for computation of joint geodesic upsampling when the input high resolution image is a binary boundary map 401. The processing steps are essentially as shown in FIG. 2, but for the processing of the binary boundary map B 401. Instead of using spatial distances and color (intensity) differences as the affinity measure between pixels as in equation (2), only the spatial distances are used for determining the geodesic distance transform 230 in this embodiment. In addition, the spatial distance is set to infinite for neighboring pixels on opposite sides of a boundary in the binary boundary map. This way, only the depth pixels in the same continuous region are used to determine the depths of pixels in that region. In other words, the upsampling is boundary-confined by the boundary map.

Effect of the Invention

The invention provides a method increasing a resolution of depth images using optical images. The method uses a joint geodesic upsampling procedure for upsampling the depth images. The upsampling is efficient and achieves real-time performance compared to the prior art.

Prior art methods have used bilateral upsampling, which causes blurry depth boundaries and depth bleeding artifacts particularly when the colors of the surfaces across the depth boundaries are similar. In addition, fine scene structures are not preserved during upsampling. Because the geodesic distance integrates joint color and spatial changes along curves, it is sensitive to thin contours around the surfaces, providing sharp depth boundaries even when the color difference between two surfaces are subtle.

Figure 5:
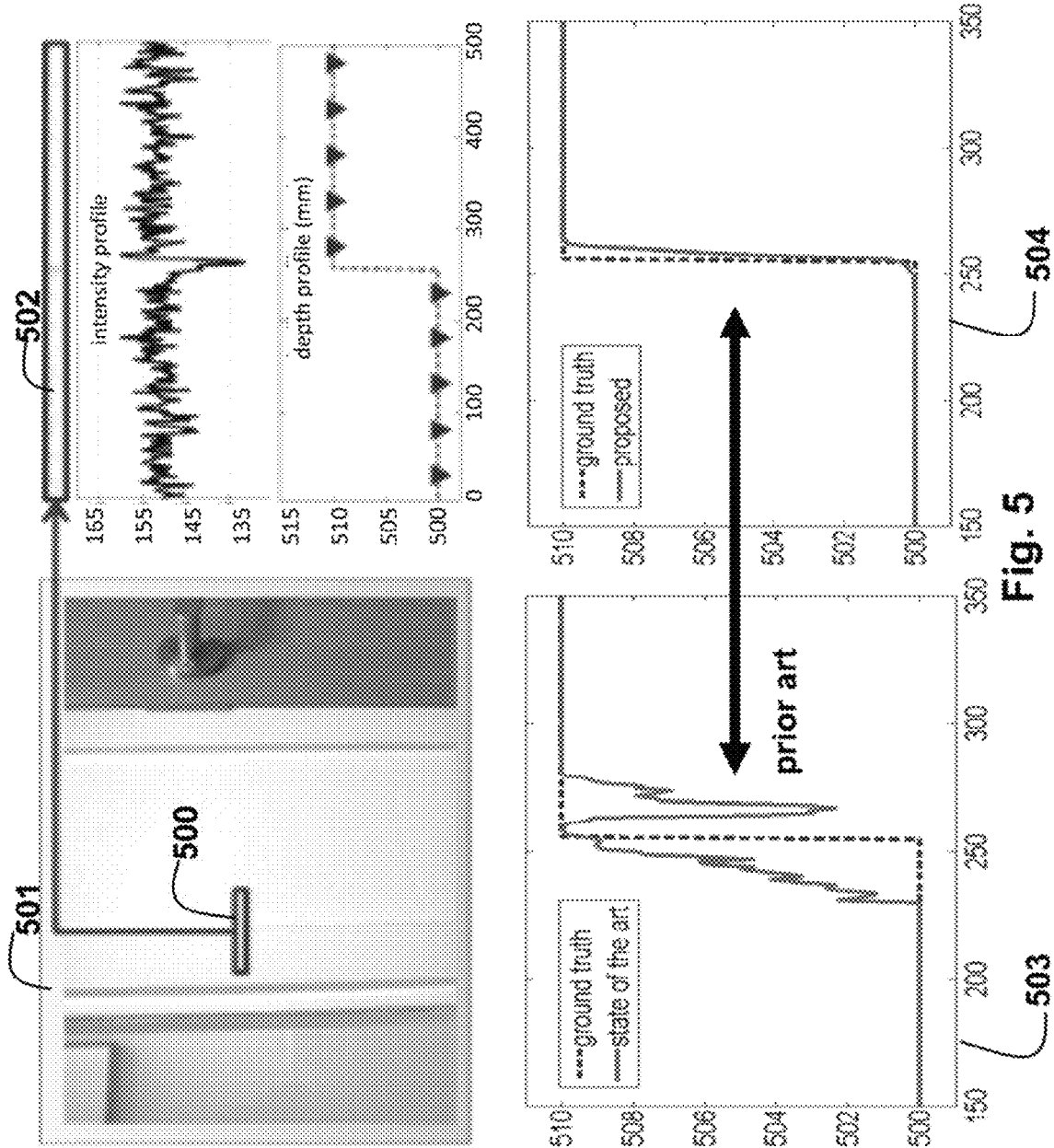
FIG. 5 is a schematic and graphs comparing joint bilateral upsampling as in the prior art and joint geodesic upsampling according to the invnetion.

FIG. 5 compares between joint bilateral upsampling as in the prior art and joint geodesic upsampling according to the invnetion. An image 501 of an indoor scene includes a wall, a door, and a window. The door and window frames have an almost identical color as the wall. Intensity and depth profiles 502 of a horizontal slice 500 of the image is shown. The triangles indicate the locations where depth measurements are collected using a low resolution depth sensor. Note that there is a thin dark band at the location of the occluding boundary of the frame and the wall, due to shading of the rounded surface edge. The upsampled depth profile 503 using joint bilateral upsampling and the the upsampled depth profile 504 using the joint geodesic upsampling are shown. The horizontal axis indicates horizontal offsets in the image, and the vertical axis depth values.

Joint geodesic upsampling integrates color changes along the geodesic curves. Therefore, it is sensitive to thin structures and fine scale changes, producing smooth surfaces with sharp occlusion boundaries, whereas the joint bilateral upsampling incorrectly propagates depth values across the depth boundary due to Euclidean color distance computation.

The method according to the invention integrates color changes along the geodesic path and accurately recovers high resolution depth profile, whereas joint bilateral upsampling smooths depth values across occlusion boundary resulting in blurring effect.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for increasing a resolution of a low resolution depth image, using joint geodesic upsampling comprising the steps of:
    computing geodesic distances in a high resolution image; and
    interpolating depths in the low resolution depth image using the geodesic distances to obtain a high resolution depth image, wherein the steps are performed in a processor, further comprising:
    demultiplexing seed pixels in the high resolution image into channels that are disjoint;
    applying the joint geodesic distance transform to the channels to produce a geodesic distance from each pixel to a nearest seed pixel in each channel; and
    propagating the depths in the low resolution depth image to the high resolution depth image according to the geodesic distances.

2. The method of claim 1, wherein a resolution of the high resolution depth image is identical to a resolution of the high resolution image.

3. The method of claim 1, further comprising:
    registering the low resolution depth image to the high resolution image.

4. The method of claim 1, wherein the high resolution image is a gray scale intensity image.

5. The method of claim 1, wherein the high resolution image is a color image.

6. The method of claim 1, wherein the geodesic distance determines an affinity measure between two pixels in the high resolution image.

7. The method of claim 6, wherein the affinity is a length of a shortest path between the two pixels.

8. The method of claim 6, further comprising:
    converting the geodesic distance into the affinity measure using a Gaussian kernel.

9. The method of claim 1, wherein pixels in the high resolution image are 8-connected and the joint geodesic distance between a pair of 8-connected pixels is defined in a joint optical and spatial domain.

10. The method of claim 1, wherein the demultiplexing partitions the low resolution depth image into a uniform grid, and a spatial distance between two consecutive pixels in a particular channel on the uniform grid is $\delta$ and $K=\delta^2$, wherein K is a number of the channels.

11. The method of claim 1, wherein the joint geodesic distance transform is solved with a dynamic program including a sequence of forward and backward passes over the high resolution image.

12. The method of claim 1, wherein the hight resolution image is a high resolution binary boundary map.

13. The method of claim 12, wherein the high resolution binary boundary map is acquired by a multi-flash camera.

14. The method of claim 12, wherein the high resolution binary boundary map is acquired by applying an edge detector to a high resolution image.

15. The method of claim 1, wherein the hight resolution image is a high resolution binary boundary map, and wherein pixels in the high resolution binary boundary map are 8-connected and the geodesic distance between a pair of connected boundary and non-boundary pixels is larger than the geodesic distance between a pair of connected non-boundary pixels.

16. The method of claim 1, wherein the joint geodesic upsampling is performed hierarchically using an image pyramid.

17. The method of claim 1, wherein the low resolution depth image is acquired by a low resolution depth sensor.

18. A system for increasing a resolution of a low resolution depth image, comprising:
    a high resolution sensor configured to acquire a high resolution image;
    a low resolution sensor configured to acquire the low resolution depth image;
    a processor for computing geodesic distances in the high resolution image and interpolating depths in the low resolution depth image using the geodesic distances to obtain a high resolution depth image, wherein the joint geodesic upsampling is performed hierarchically using an image pyramid.

19. A method for increasing a resolution of a low resolution depth image, using joint geodesic upsampling comprising:
    computing geodesic distances in a high resolution image, wherein the geodesic distance determines an affinity measure between two pixels in the high resolution image; and
    interpolating depths in the low resolution depth image using the geodesic distances to obtain a high resolution depth image; and
    converting the geodesic distance into the affinity measure using a Gaussian kernel, wherein steps of the method are performed in a processor.

* * * * *